(12) United States Patent
Gelfond et al.

(10) Patent No.: US 7,835,155 B2
(45) Date of Patent: Nov. 16, 2010

(54) COMPUTER MEMORY SOCKET PARTICULATE MANAGEMENT SYSTEM AND METHOD

(75) Inventors: Yefim Gelfond, Danville, CA (US); Gurpreet S. Dayal, Fremont, CA (US)

(73) Assignee: Oracle America, Inc., Redwood City, CA (US)

( * ) Notice: Subject to any disclaimer, the term of this patent is extended or adjusted under 35 U.S.C. 154(b) by 447 days.

(21) Appl. No.: 11/946,992

(22) Filed: Nov. 29, 2007

(65) Prior Publication Data

US 2009/0141434 A1   Jun. 4, 2009

(51) Int. Cl.
*H05K 5/00*   (2006.01)
(52) U.S. Cl. ................... 361/759; 361/801; 361/802
(58) Field of Classification Search ................ 361/727, 361/737, 756, 686, 741, 801, 802; 439/377, 439/374
See application file for complete search history.

(56) References Cited

U.S. PATENT DOCUMENTS

| | | | |
|---|---|---|---|
| 6,241,545 B1 * | 6/2001 | Bricaud et al. | 439/326 |
| 6,347,039 B1 | 2/2002 | Lee | |
| 6,629,855 B1 * | 10/2003 | North et al. | 439/325 |
| 7,057,901 B2 * | 6/2006 | Roscoe et al. | 361/796 |
| 7,403,388 B2 * | 7/2008 | Chang | 361/695 |
| 7,626,819 B1 * | 12/2009 | Chen | 361/695 |
| 2003/0090879 A1 | 5/2003 | Doblar et al. | |

* cited by examiner

*Primary Examiner*—Hung S Bui
(74) *Attorney, Agent, or Firm*—Brooks Kushman P.C.

(57) ABSTRACT

A cover for memory sockets of a computer memory module includes a face panel spaced away from the memory sockets. The cover is held in place via latches associated with the memory sockets. Tabs are spaced along opposite sides of the cover to define openings for the memory sockets. Members span between opposite pairs of tabs to define air passageways underneath the cover. Each member resides between an adjacent pair of memory sockets.

17 Claims, 8 Drawing Sheets

COMPUTER MEMORY SOCKET PARTICULATE MANAGEMENT SYSTEM AND METHOD

FIELD OF THE INVENTION

The invention relates to computer memory socket particulate management systems and methods.

BACKGROUND ART

Computer memory modules are well known in the art. U.S. Pat. No. 6,347,039 to Lee is an example of a computer memory module. Lee provides a memory module that includes a plurality of semiconductor memory devices mounted on a printed wiring board (PWB). The memory module also includes longitudinal contact terminals for connecting to a computer mother board arranged along at least one longitudinal edge of the PWB and transverse contact terminals for connecting to the computer mother board arranged along at least one transverse edge of the PWB. A socket for the module includes at least one longitudinal part into which the longitudinal contact terminals are inserted and at least one transverse part into which the transverse contact terminals are inserted. Each transverse socket part can be mounted on a pivot attached to the longitudinal part and rotated to engage a PWB inserted in the longitudinal part. Alternatively, each transverse part can be a flexible circuit carrier.

U.S. Pat. Pub. 2003/0090879 to Doblar et al. is another example of a computer memory module. Doblar et al. provides a memory module for expanding memory of a computer. The memory module comprises a printed circuit board including a connector edge having a plurality of contact pads configured to convey data signals, power and ground to and from the printed circuit board. The power and ground contact pads alternate along the connector edge with no more than four adjacent data signal contact pads without intervening power or ground contact pads. A plurality of memory devices are mounted on the printed circuit board. A clock driver is coupled to each of the plurality of memory devices and is configured to receive a differential clock signal and to produce at least one single-ended clock signal for clocking the plurality of memory devices. The clock driver includes a phase-locked loop for phase-locking the at least one single-ended clock signal.

SUMMARY

A computer memory module includes a plurality of adjacent memory sockets. Each of the memory sockets is configured to receive a memory card within a slot and to retain the memory card via a latch. A particulate management system for the memory sockets includes a cover to cover the slots. The cover is configured to be retained by at least one of the latches.

A cover for a plurality of computer memory sockets, each having a memory card slot and a memory card latch, includes a panel portion to cover the memory card slots and a ledge portion to be retained by one of the memory card latches.

A method for managing dust and debris within a computer memory module includes providing a plurality of computer memory sockets that are each configured to receive a memory card within a slot and to retain the memory card via a latch. The method also includes positioning a cover over the plurality of computer memory sockets such that at least one of the latches retains the cover relative to the plurality of computer memory sockets.

While exemplary embodiments in accordance with the invention are illustrated and disclosed, such disclosure should not be construed to limit the claims. It is anticipated that various modifications and alternative designs may be made without departing from the scope of the invention.

DETAILED DESCRIPTION

Figure 1:
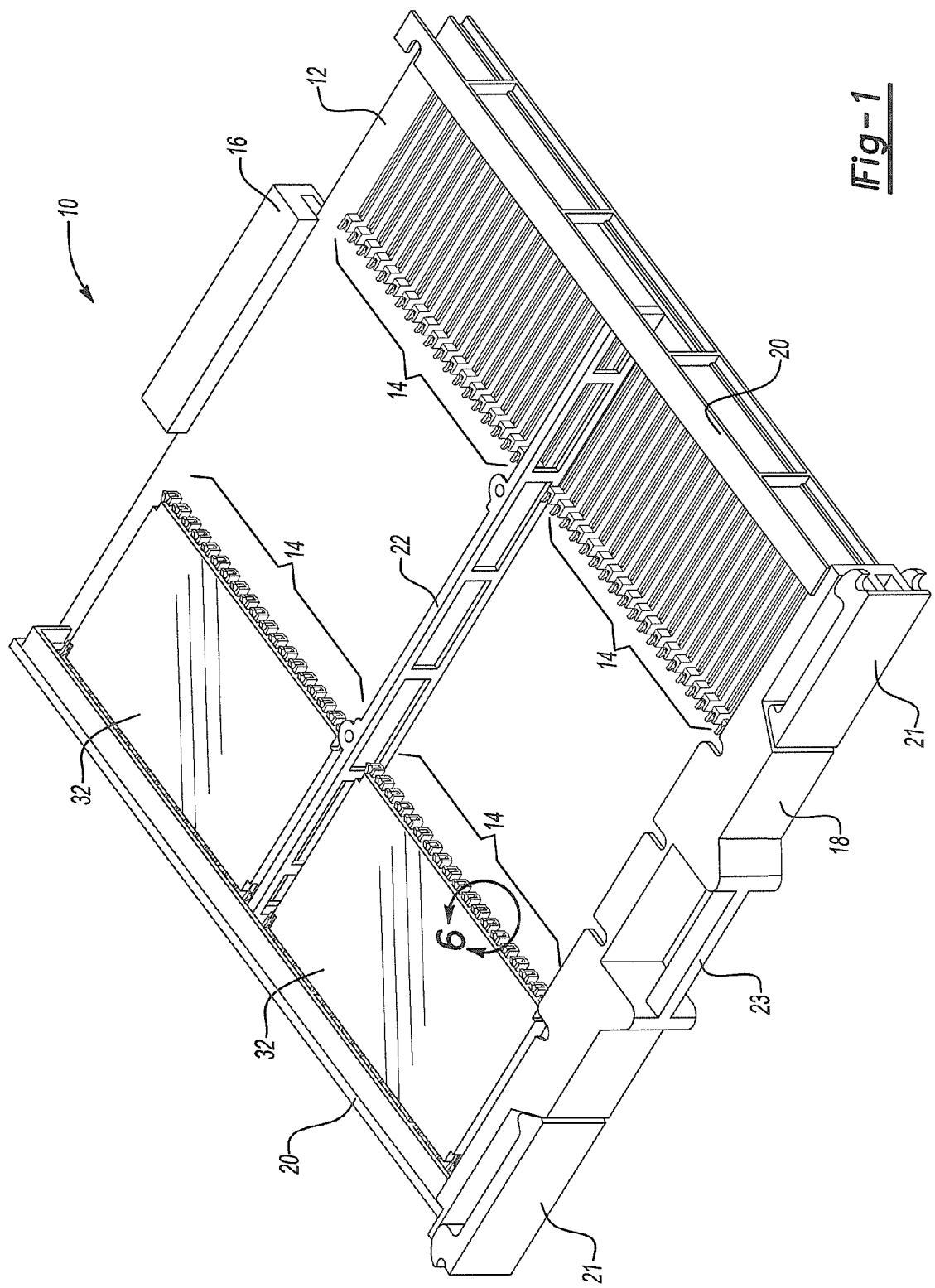
FIG. 1 is a perspective view of an exemplary computer memory module including memory socket covers according to certain embodiments of the invention.

Referring to FIG. 1, an exemplary computer memory module 10 includes a printed circuit board (PCB) 12, a plurality of memory sockets 14, e.g., DDR2, FBDIM, etc., mounted thereon and an electrical connector 16 to electrically couple the computer memory module 10 to other components of a computer (not shown). The computer memory module 10 also includes an end support 18, side supports 20 connected with the end support 18 and a middle support 22 connected with the side supports 20. The supports 18, 20, 22 improve the structural rigidity of the printed circuit board 12 and permit the computer memory module 10 to be mounted within a central processing unit (not shown) of the computer. One or more computer memory modules 10 may be installed within the central processing unit to expand the available memory of the computer. A handle 23 formed in the end support 18 facilitates ease of installation and removal from the central processing unit. The illustrated handle of FIG. 1 also includes spaced apart latch members 21 at opposed ends of the end support 18. The latch members 21 can secure the computer memory module 10 in place when installed in the central processing unit.

The computer memory module 10 of FIG. 1 includes eighty memory sockets 14 located in four quadrants of twenty each. In an exemplary embodiment, the memory sockets 14 of each quadrant are spaced approximately 5.16 mm apart. In other examples, the memory sockets 14 may be spaced approximately 3 to 6 mm apart. The memory sockets 14 permit a user to expand or reduce the amount of available memory of the computer by installing or removing memory cards (not shown). In other examples, the number of memory sockets 14 may vary from less than four to more than eighty. As an example, two groups of ten memory sockets 14 may be located on the same side of the printed circuit board 12. As another example, two groups of five memory sockets may be located on opposite sides of the printed circuit board 12. Other configurations and arrangements are also possible.

In the exemplary computer memory module illustrated in FIG. 1, two memory socket covers 32 are installed in two quadrants of the computer memory module 10. As explained in more detail below, the memory socket covers 32 hinder the accumulation of dust and debris on electrical contacts (not shown) within the memory sockets 14 as well as promote proper air flow over the computer memory module 10.

Figure 2:
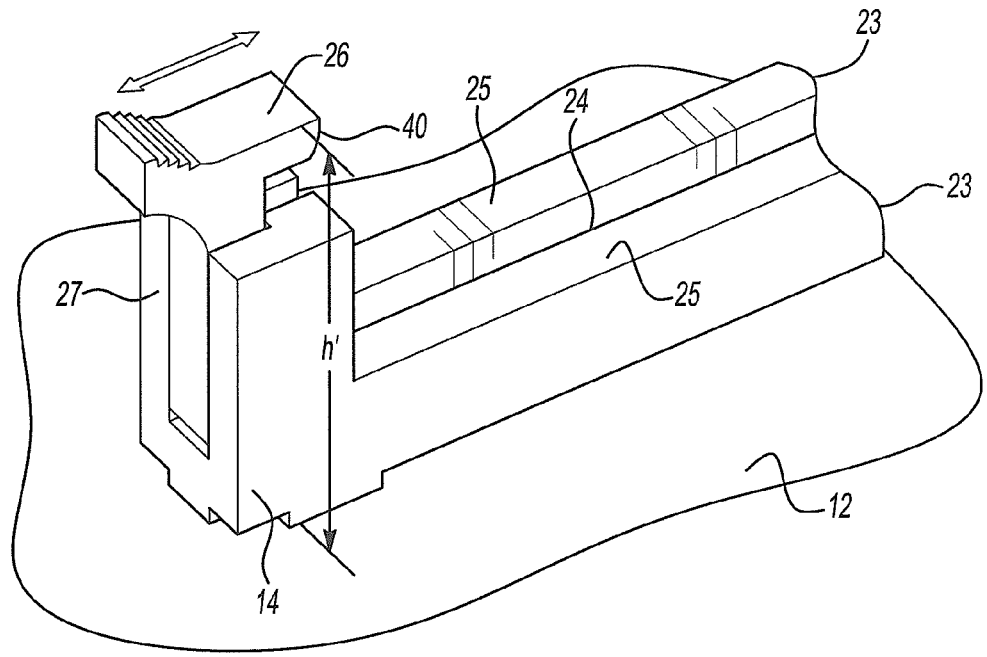
FIG. 2 is an enlarged perspective view of a portion of a memory socket of the computer memory module of FIG. 1.

Referring to FIG. 2, each memory socket 14 includes a pair of generally parallel walls 23 spaced apart to define a slot 24 configured to receive a memory card (not shown), such as a dual in-line memory module (DIMM). The slot 24 opens on faces 25 of the walls 23. Electrical contacts (not shown) that interface with the memory card reside in the slot 24. Each memory socket 14 also includes a latch 26 disposed within a latch tower 27 on opposing ends of the memory socket 14. The latch 26 is moveable towards and away from the slot 24 within the latch tower 27 as indicated by arrow. The latch 26 retains the memory card when it is inserted into the slot 24.

The memory socket 14 illustrated in FIG. 2 is unpopulated because it lacks a memory card. The electrical contacts (not shown) that reside within the slot 24 of this unpopulated memory socket 14 may accumulate dust and debris due to environmental exposure. As an example, air within the central processing unit (not shown) may contain dust particles that settle on the electrical contacts. Over time, a layer of dust may form on the exterior of the electrical contacts. Such dust may interfere with the proper functioning of the memory socket 14 if it is later populated with a memory card.

A fan (not shown) for moving air over the computer memory module 10 (FIG. 1) is designed to operate at speeds based on the assumption that the memory sockets 14 (FIG. 1) are populated. Proper air flow over the computer memory module 10 may be disrupted when a series of adjacent memory sockets 14 lack memory cards. As an example, an air vortex may form over regions of the unpopulated memory sockets 14 because the air pressure over the computer memory module 10 is less than circumstances where the series of adjacent memory sockets 14 are populated.

Figure 3:
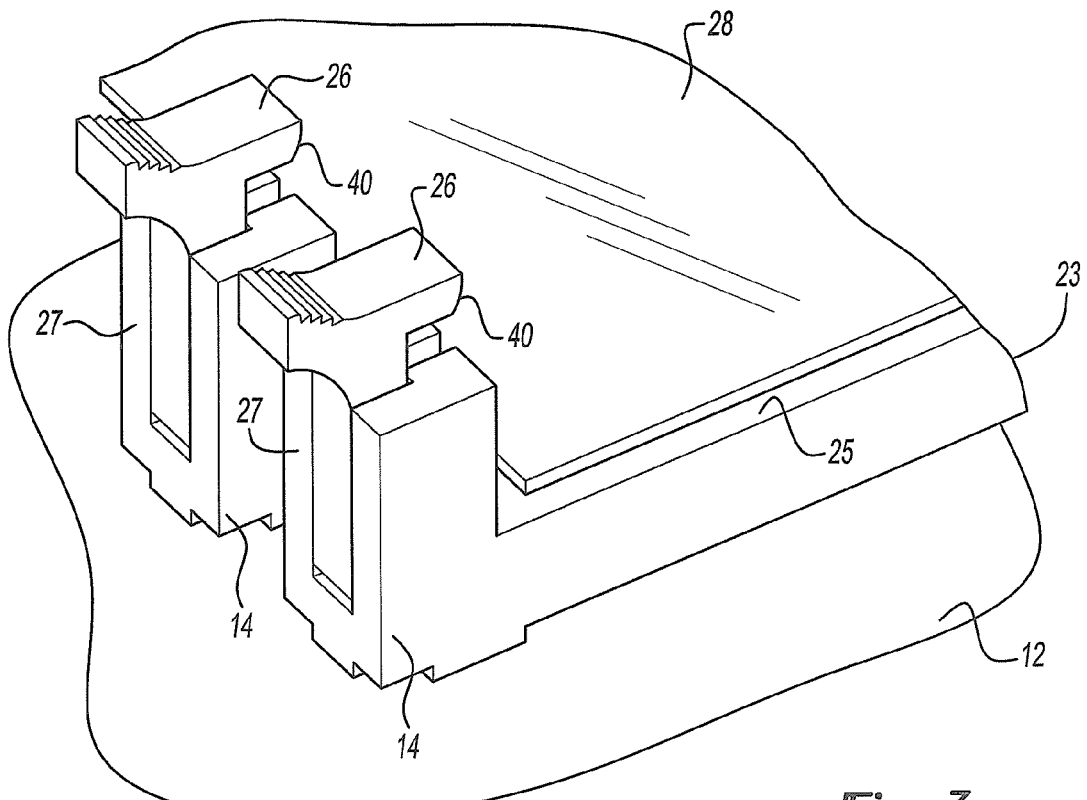
FIG. 3 is an enlarged perspective view of a portion of memory sockets of the computer memory module of FIG. 1 including a prior art flat plastic piece placed on top of the memory sockets.

Referring to FIG. 3, a prior art flat plastic piece 28 has been placed on top of the unpopulated memory sockets 14 in an attempt to prevent the electrical contacts (not shown) from accumulating dust and debris. The plastic piece 28, however, may move relative to the memory sockets 14 if, for example, the computer memory module 10 is moved. As the plastic piece 28 moves, the electrical contacts associated with any uncovered slots 24 may begin to accumulate dust and debris. Additionally, an air vortex may form over regions of the plastic piece 28 for the reasons explained above.

Figure 4:
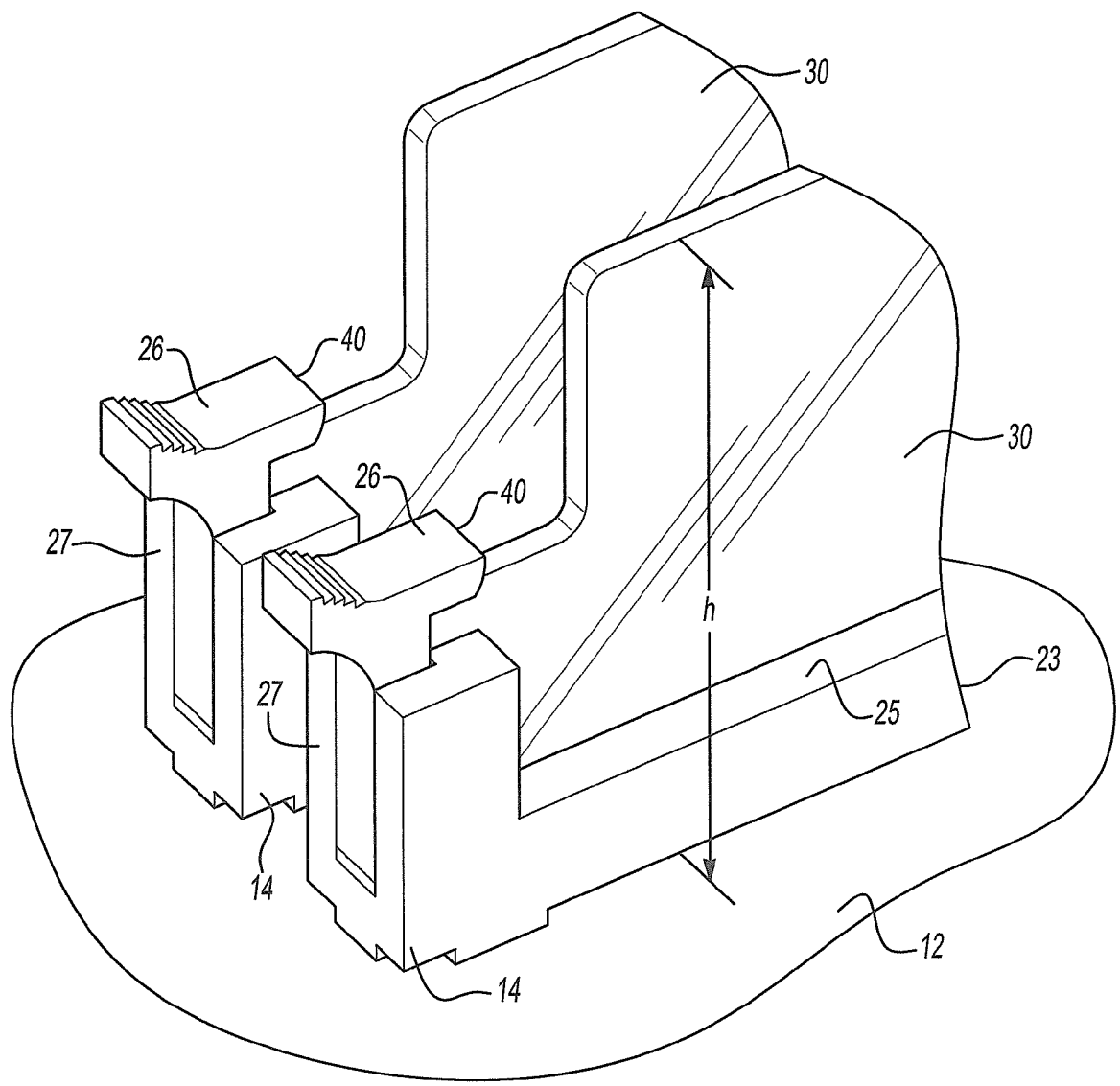
FIG. 4 is an enlarged perspective view of a portion of memory sockets of the computer memory module of FIG. 1 including a series of prior art mock memory cards installed in the memory sockets.

Referring to FIG. 4, a series of prior art mock memory cards 30 have been inserted into the respective slots 24 of the unpopulated memory sockets 14 in a prior art attempt to prevent the electrical contacts (not shown) from accumulating dust and debris and to help promote proper air flow over the computer memory module 10. The mock memory cards 30 are dimensionally similar to real memory cards (not shown). For example, the height of the mock memory cards 30 is approximately equal to the height of real memory cards. The mock memory cards 30, however, do not provide any memory functionality.

This technique has not proven beneficial as the mock memory cards 30 may cause electrical contact degradation because of contact with the electrical contacts (not shown) within the slots 24. Additionally, it may be time consuming and tedious to install (or remove), for example, twenty mock memory cards 30 into respective memory sockets 14.

Figure 5:
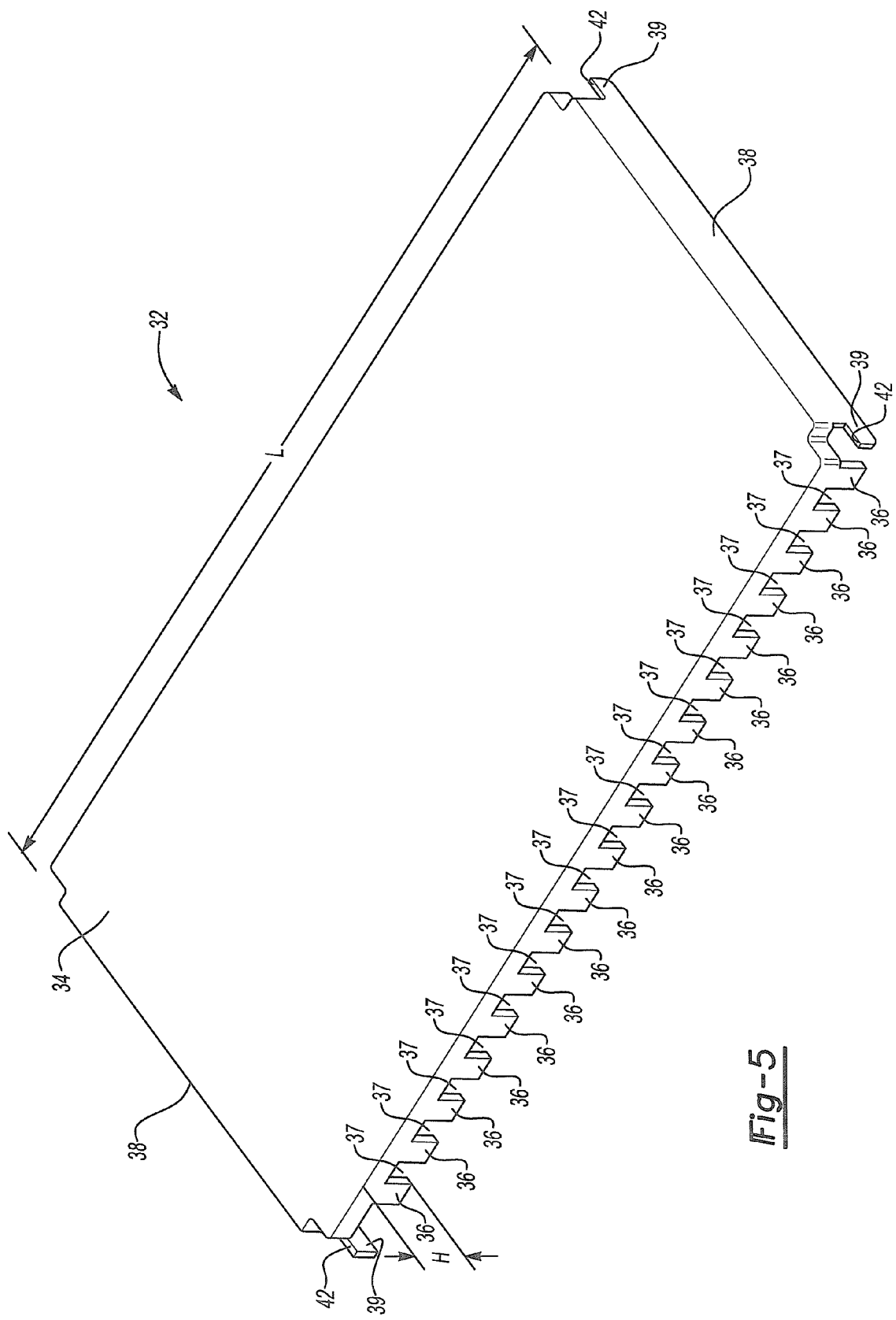
FIG. 5 is a top perspective view of a memory socket cover according to certain embodiments of the invention.

Referring to FIG. 5, the memory socket cover 32 includes a panel portion 34, a plurality of tabs 36 spaced longitudinally along the panel portion 34 and end portions 38 formed along opposite ends of the width of the panel portion 34. The memory socket cover 32 has a generally uniform thickness of 1.2 mm. In other examples, the thickness of the memory socket cover 32 may range from 1.00 mm to 2.4 mm. Other thicknesses are also possible. The plurality of tabs 36 and end portions 38 extend generally perpendicularly away from the panel portion 34. The panel portion 34, when installed, covers at least some of the slots 24 of the memory sockets 14 and reduces the amount of dust and debris accumulated by the electrical contacts (not shown).

Any suitable manufacturing technique may be used to make the memory socket cover 32. As an example, the memory socket cover 32 may be made via injection molding of ABS plastic. As another example, the memory socket 32 may be machined from a solid piece of plastic.

In at least certain embodiments, the height, H, of the memory socket cover 32 is approximately the same as the height, h, of the mock memory card 30 (FIG. 4) if installed in the memory socket 14 (FIG. 4). As an example, if the height, h, from the PCB 12 (FIG. 4) to the top of the mock memory card 30 is 33.65 mm, then the height, H, from the bottom of the tabs 36 to a top surface of the panel portion 34 is approximately 33.65 mm. The memory socket cover 32 thus helps to promote proper airflow over the computer memory module 10 by occupying an effective volume similar to that of populated memory sockets. In other examples, the height, H, may be different than the height, h, and may depend on the volume of the enclosure (not shown) surrounding the computer memory module 10 (FIG. 1). As an example, a relatively voluminous enclosure may allow for the height, H, to be greater than the height, h. Other configurations and dimensions are also possible.

Figure 6:
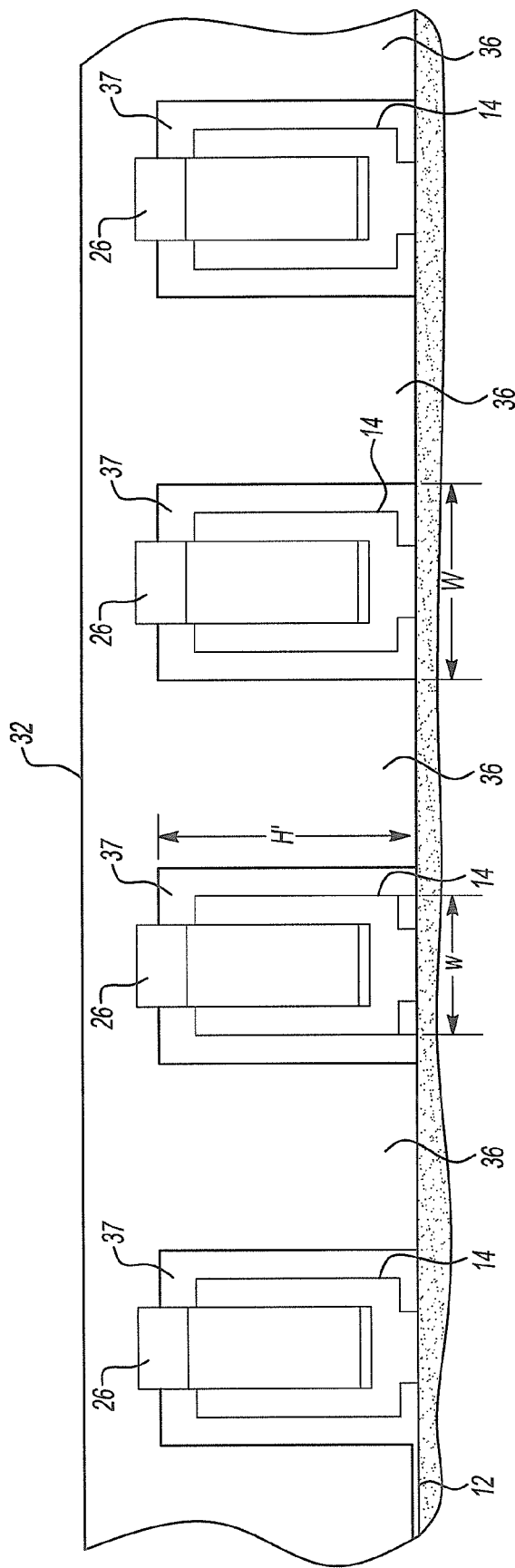
FIG. 6 is an enlarged side view, partially in cross-section, of a portion of memory sockets of the computer memory module and memory socket cover of FIG. 1 taken about line 6 of FIG. 1.

Referring to FIG. 6, at least a plurality of the tabs 36 rest on the PCB 12 and are spaced apart to form gaps 37. At least some of the gaps 37 have a width, W, greater than the width, w, of a memory socket 14. Air can thus flow through these gaps 37 and around the memory sockets 14. In the example of FIG. 6, the width, W, of the gaps 37 is approximately 11.75 mm. The width, w, of the memory sockets 14 is 7.54 mm. In other examples the width, W, may range from just larger than the width of one the memory sockets 14 to any desired width. At least some of the gaps 37 have a height, H', greater than the height, h', of an end portion 40 (FIG. 2) of the latch 26. In the example of FIG. 6, the height, H', of the gaps 37 is approximately 11.45 mm. The end portion 40 can thus intrude underneath at least a portion of the panel portion 34. In other examples, the height, H', of the gaps 37 may be different than 11.45 mm. As an example, the height, H', may be substantially equal to the height, H, of the memory socket cover 32. Other heights are also possible.

Fewer tabs 36 may be spaced apart to form fewer gaps in other examples. As an example, one tab 36 may be located approximately half way between the end portions 38. Two gaps are thus formed. As another example, three tabs 36 may be evenly spaced apart to form four gaps. In still other examples, the tabs 36 may be absent to, for example, promote the desired air flow over the memory sockets 14. Other configurations and arrangements are also possible.

Referring to FIG. 5, the end portions 38 include extended legs 39 located at the corners of the memory socket cover 32. Each leg 39 includes a ledge 42. The ledges 42 are generally parallel with the panel portion 34. The ledges 42 provide a retaining surface for the end portions 40 (FIG. 2) of the latches 26 of a pair of memory sockets 14. In other examples, the ledges 42 may be located at any suitable location on the memory socket cover 32. As an example, the ledges 42 may be located half way between the end portions 38. In still other examples, a fewer number of legs 39, and thus ledges 42, may be provided. As an example, the memory socket cover 32 may include only a single leg 39.

Figure 8:
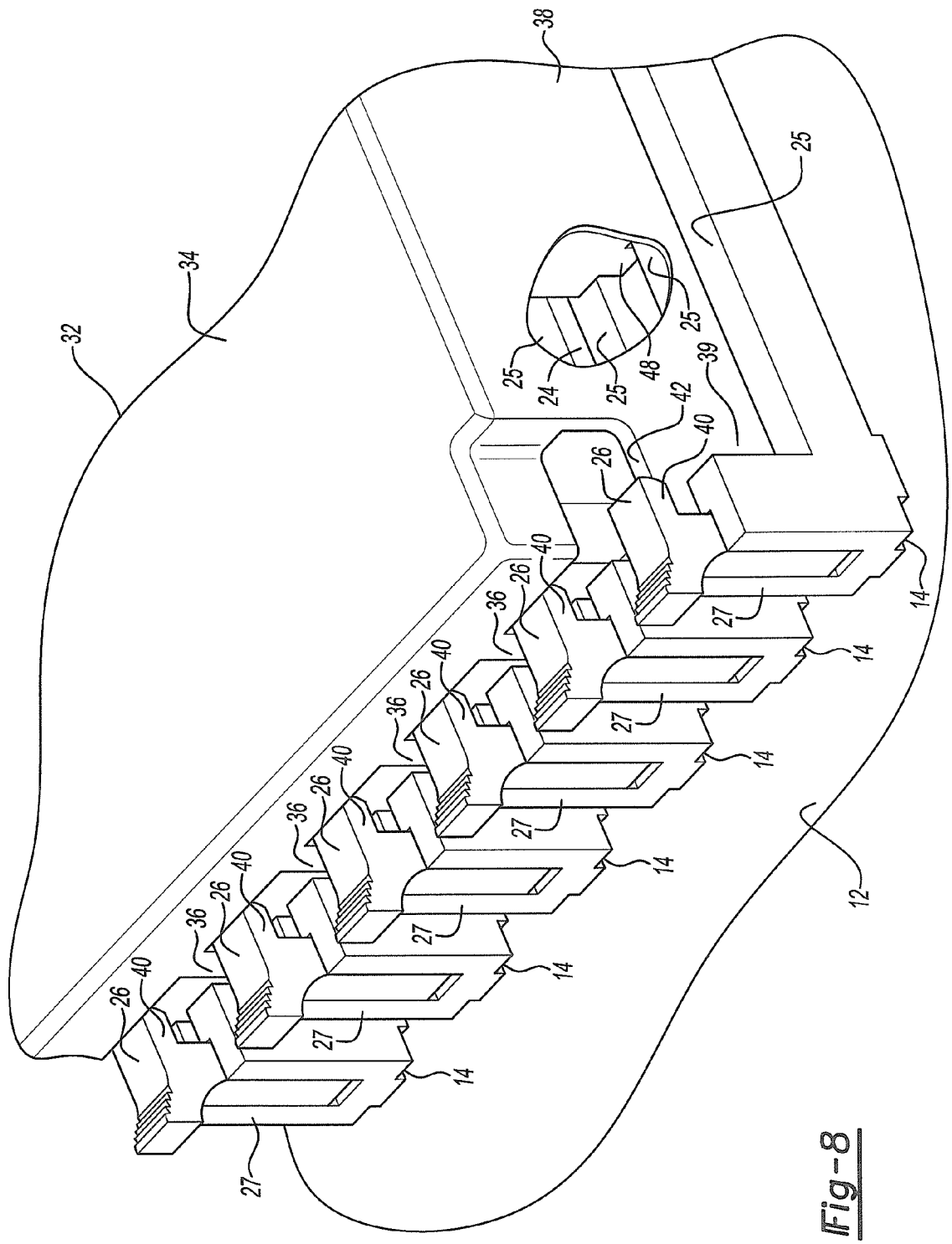
FIG. 8 is an enlarged perspective view of a portion of the computer memory module and memory socket cover of FIG. 1.

In at least the illustrated embodiment, the end portions 38 rest on respective faces 25 of a pair of end memory sockets 14 (FIG. 8). The memory socket cover 32 has a sufficient length, L, such that the slots 24 of the pair of memory sockets 14 on which the end portions 38 rest are underneath the panel portion 34. In other examples, the memory socket cover 32 may have a length, L, such that the slots 24 of the memory sockets 14 on which the end portions 38 rest are not underneath the panel portion 34. In still other examples, the end portions 38 may include openings to further promote desired air flow over the computer memory module 10 (FIG. 1).

Figure 7:
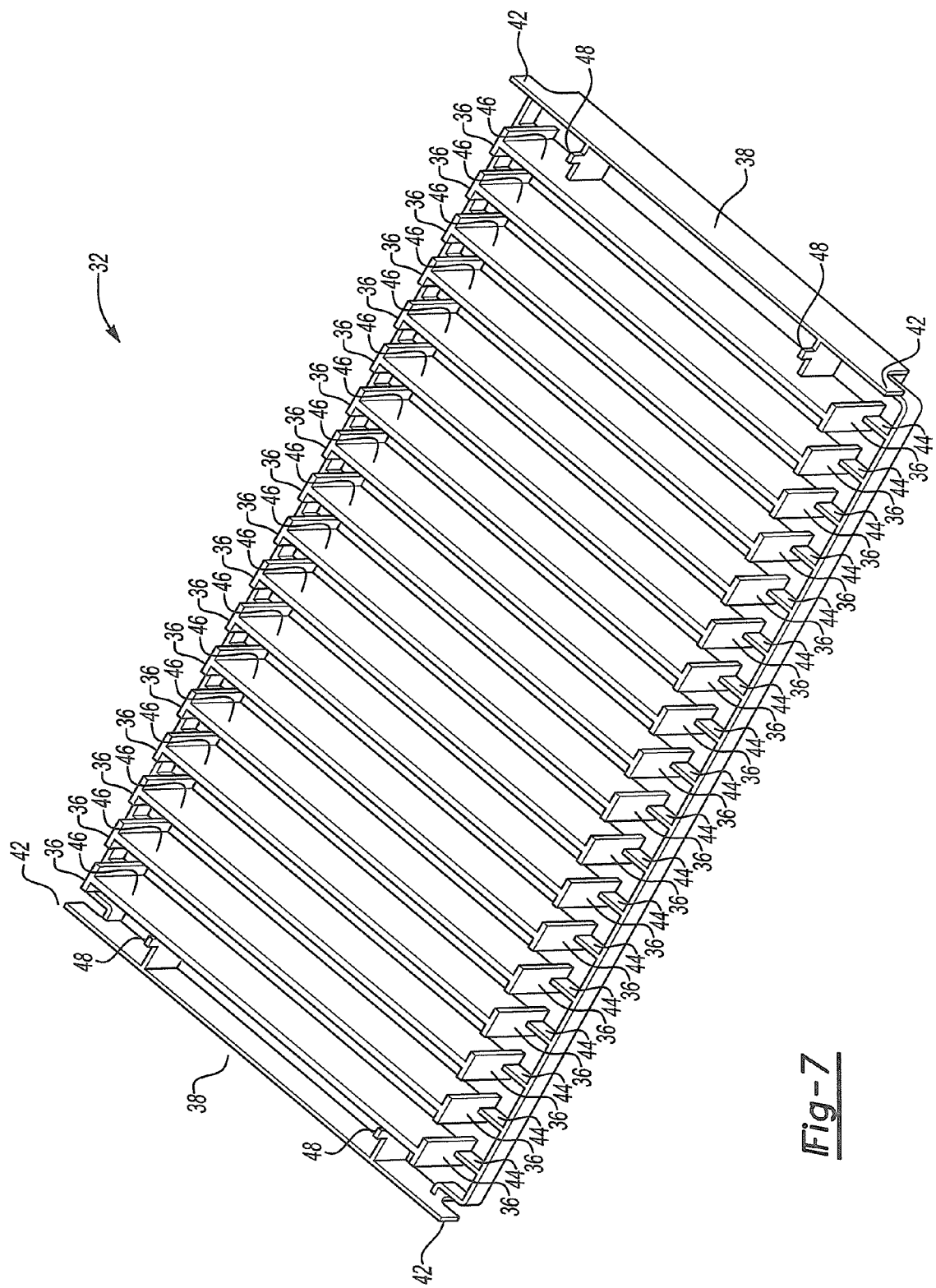
FIG. 7 is a bottom perspective view of the memory socket cover of FIG. 5.

Referring to FIG. 7, each of the tabs 36 includes a buttress 44 extending from the panel portion 34 and a base of each of the tabs 36. The buttresses 44 support the tabs 36.

Members 46 extend generally perpendicular away from the panel portion 34 and span between respective pairs of tabs 36. The members 46 provide support for the panel portion 34 and the tabs 36. When the memory socket cover 32 is installed, at least a portion of the bottom of some of the members 46 rests on the PCB 12 (FIG. 8) and the members 46 define air paths along each of the memory sockets 14 (FIG. 8). In other examples, fewer members 46 may span between respective pairs of tabs 36. As an example, every other respective pair of tabs 36 may have a member 42 spanning between them. Other configurations are also possible.

Locators 48 extend generally perpendicularly away from the panel portion 34 and locate the memory socket cover 32 relative to the memory sockets 14 by resting between an adjacent pair of memory sockets 14 (FIG. 8). In the illustrated embodiment, each of the locators 48 is formed between a member 46 and an end portion 38. In other examples, the locators 48 may be positioned other than near the end portions 38. As an example, the locators 48 may be formed between two adjacent members 46 near the center of the memory socket cover 32.

Referring to FIG. 8, the memory socket cover 32 is placed over at least some of the memory sockets 14. The memory socket cover 32 is retained via the latches 26 at each corner of the memory socket cover 32. The panel portion 34 does not extend over the ledges 42 to facilitate ease of installation and removal of the memory socket cover 32.

The memory socket cover 32 has a length sufficient to cover the slots 24 of twenty adjacent memory sockets 14. In other examples, the memory socket cover 32 may have a length sufficient to cover one, four or any number of slots 24 of adjacent memory sockets 14.

Figure 9:
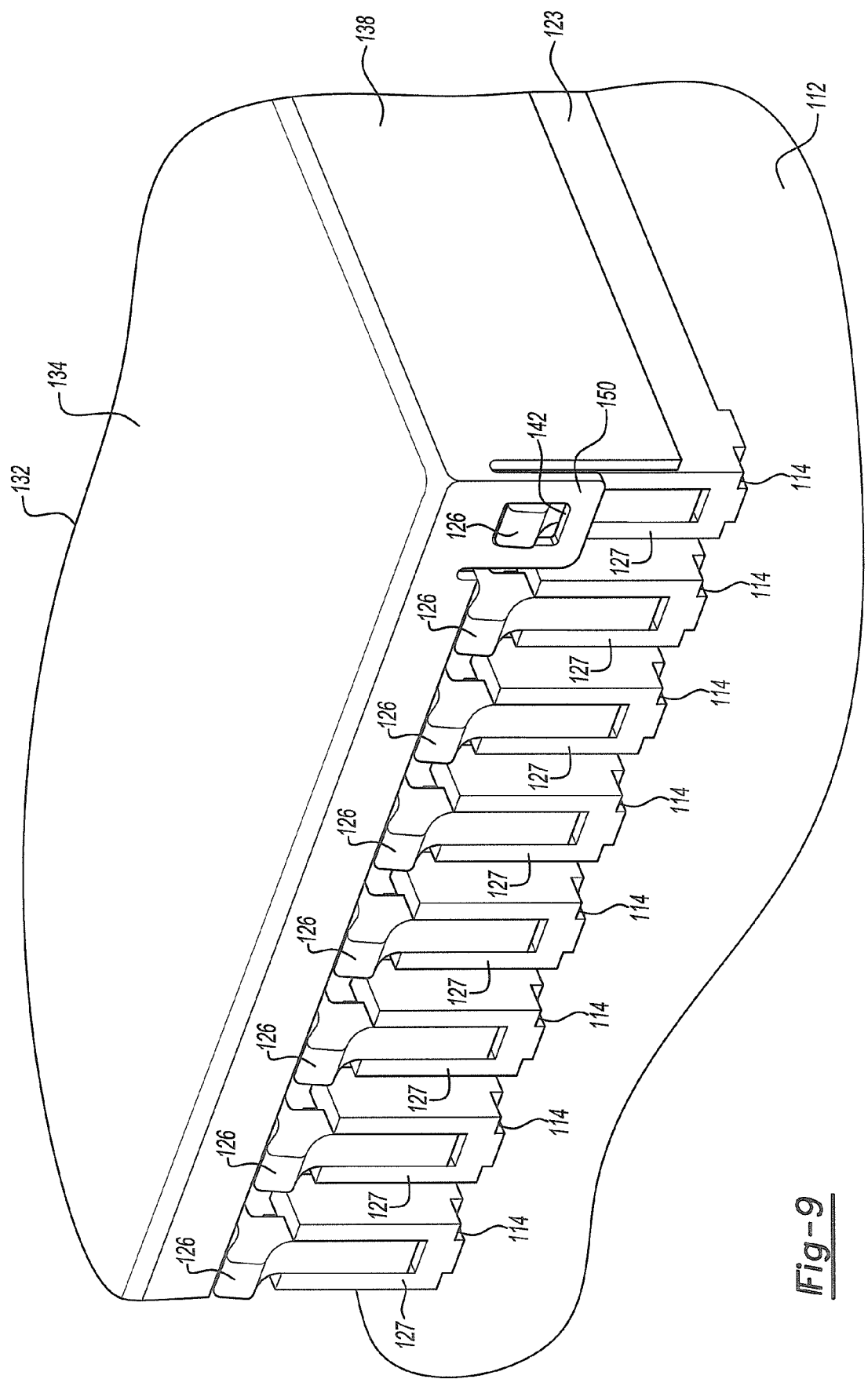
FIG. 9 is an enlarged perspective view of a portion of another computer memory module and memory socket cover according to certain embodiments of the invention.

Referring to FIG. 9, a memory socket cover 132 placed over memory sockets 114 includes a panel portion 134 and end portions 138 formed along opposite ends of the width of the panel portion 134. Numbered elements of FIG. 9 that differ by 100 relative to numbered elements of FIGS. 1-8 have similar, although not necessarily identical, descriptions to the numbered elements of FIGS. 1-8. Each corner of the memory socket cover 132 includes a windowed tab 150. Each windowed tab 150 extends generally perpendicular away from the panel portion 134 and includes an opening 142 that receives at least a portion of one of the latches 126. The memory socket cover 132 is thus retained via the latches 126 at each corner of the memory socket cover 132. In other examples, the windowed tabs 150 may be located at any suitable location on the memory socket cover 132. As an example, the windowed tabs 150 may be located half way between the end portions 138. In still other examples, a fewer number of windowed tabs 150 may be provided. As an example, the memory socket cover 132 may include only two windowed tabs 150 located at opposite corners of the memory socket cover 150. Other configurations and arrangements are also possible.

The end portions 138 extend past respective faces (not shown) of a pair of end memory sockets 114. Other configurations are also possible. As an example, the end portions 138 may not extend past respective faces of the pair of end memory sockets 114 to promote desired airflow over the memory sockets 114. As another example, the end portions 138 may extend such that they rest on PCB 112 to support the panel portion 134.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed:

1. A particulate management system for a computer memory module including a plurality of adjacent memory sockets that are each configured to receive a memory card within a slot and to retain the memory card via a latch, the system comprising:
 a cover to cover the slots and to be retained by at least one of the latches, the cover including (i) a face panel and (ii) a locator, depending from the face panel, to locate the cover relative to the memory sockets, wherein the face panel is spaced away from the slots and the locator is disposed between an adjacent pair of the memory sockets if the cover is retained by at least one of the latches.

2. The system of claim 1 wherein the cover includes a plurality of members, depending from the face panel, to be supportable on the computer memory module and to direct air underneath the cover.

3. The system of claim 2 wherein each of the plurality of members is disposed between an adjacent pair of the memory sockets if the cover is retained by at least one of the latches.

4. The system of claim 1 wherein the cover includes an end portion depending from the face panel and a ledge portion, depending from the end portion, to be retained by one of the latches.

5. The system of claim 1 wherein the cover includes a side portion depending from the face panel and a ledge portion, at least partially defining an opening in the side portion, to be retained by one of the latches.

6. The system of claim 1 wherein the cover includes a plurality of tabs depending from the face portion and spaced along a side of the cover to define air entrance ways underneath the cover.

7. The system of claim 1 wherein the height of the cover is approximately equal to the height of a memory card if the memory card is received by the slot and retained by the latch.

8. A cover for a plurality of computer memory sockets, each of the plurality of computer memory sockets including a memory card slot to receive a memory card and a memory card latch to retain the memory card, the cover comprising:

a panel portion to cover the memory card slots; and a side portion extending generally perpendicular from the panel portion and including a ledge to be retained by one of the memory card latches, wherein the side portion rests upon a face portion of one of the computer memory sockets if the ledge is retained by one of the memory card latches.

9. The cover of claim 8 wherein the panel portion is spaced away from the memory card slots if the ledge portion is retained by one of the memory card latches.

10. The cover of claim 8 further comprising a plurality of tabs extending from the panel portion and spaced along opposite sides of the cover to define air entrance ways underneath the panel portion.

11. The cover of claim 10 wherein the height of the tabs is greater than the height of an end portion of the memory card latches.

12. The cover of claim 10 further comprising a member extending from the panel portion and spanning between a pair of opposite tabs to support the panel portion and to at least partially define an air passageway underneath the panel portion.

13. The cover of claim 12 wherein the member is disposed between an adjacent pair of the plurality of computer memory sockets if the ledge is retained by one of the memory card latches.

14. The cover of claim 8 further comprising a locating feature extending from the panel portion to locate the panel portion relative to the plurality of computer memory sockets wherein the locating feature is disposed between an adjacent pair of the plurality of computer memory sockets if the ledge portion is retained by one of the memory card latches.

15. The cover of claim 8 wherein the height of the cover is approximately equal to the height of a memory card if the memory card is received by the memory card slot and retained by the memory card latch.

16. The cover of claim 8 wherein the width of the panel portion is less than the width of one of the computer memory sockets.

17. A particulate management system for a computer memory module including a plurality of adjacent memory sockets that are each configured to receive a memory card within a slot and to retain the memory card via a latch, the system comprising:

a cover to cover the slots and to be retained by at least one of the latches, the cover including (i) a face panel and (ii) a plurality of members, depending from the face panel, to be supportable on the computer memory module and to direct air underneath the cover, wherein the face panel is spaced away from the slots and each of the plurality of members is disposed between an adjacent pair of the memory sockets if the cover is retained by at least one of the latches.

* * * * *